1

3,269,962
SELF-EXTINGUISHING POLYMER COMPOSITION CONTAINING A HALIDE AND A HYDRAZONE
Jacob Eichhorn, Midland, Mich., assignor to The Dow Chemical Company, Midland, Mich., a corporation of Delaware
No Drawing. Filed Apr. 1, 1963, Ser. No. 269,735
9 Claims. (Cl. 260—2.5)

This invention relates to self-extinguishing polymer compositions and the method for preparing them. More precisely the invention concerns the combination of a hydrazone with a halide to render alkenyl aromatic polymers self-extinguishing.

Polymers of resins produced by the polymerization of alkenyl aromatic compounds such as styrene are highly flammable and must be combined with flameproofing agents when this characteristic cannot be tolerated. A number of materials capable of reducing the burning properties of these resins have been found to be compatible with them and are used at the present time. These flameproofing agents are halides containing chlorine and/or bromine, with those containing the latter halogen usually being more effective than those containing the former. The presence of these agents in the resin ordinarily affects properties other than the flammability such as softening point, impact and tensile strength, mold corrosion and color stability, both at elevated temperatures and in the presence of actinic light. Therefore it is customary to use the least amount of halide that is necessary to obtain the desired flameproofing properties to minimize the degeneration of these other properties.

According to this invention, an adjuvant is intimately mixed with the resin to enhance the flameproofing activity of the halide so that a lower concentration may be used to obtain a particular level of flameproofing. It has been found that a particular group of hydrazones may be used in combination with halides to produce self-extinguishing polymers of alkenyl aromatic compounds. Accordingly, a substantial reduction in the concentration of the halide is possible when the adjuvant is used.

The hydrazones which have been found to be capable of effecting this improvement may be represented by the general formula

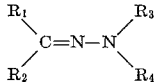

wherein $R_1$ represents an alkyl, aryl, or aralkyl radical, $R_2$ represents an alkyl, aryl or aralkyl radical or a hydrazone group having the general formula

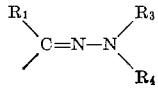

$R_3$ represents hydrogen or an alkyl, aryl, or aralkyl radical and $R_4$ represents an aryl, aralkyl or halogenated aryl radical. These hydrazones are the type which may be produced by the reaction of a ketone with a phenylhydrazine. Examples of hydrazones covered by this general formula are those which may be obtained by reacting phenylhydrazine with acetone, methyl ethyl ketone, diethyl ketone, methyl propyl ketone, acetophenone, benzophenone and hexanonephenone as well as diketones such as 2,3-pentanedione having adjacent carbonyl groups. In addition to phenyl hydrazines, suitable adjuvants may be prepared from 2,5-dichlorophenylhydrazine and 1,1-diphenyl hydrazine.

These flameproofing agents may be used with alkenyl aromatic homopolymers and copolymers derived from any of several monomers. Examples of these monomers are styrene, α-methyl styrene, ethyl styrene, isopropyl styrene, tert.-butyl styrene, vinyl toluene, vinyl xylene, and chlorostyrene. Copolymers containing primarily styrene with minor amounts of the other monomers as well as the high impact type styrene polymers which contain from about 2 percent to about 20 percent by weight of a rubber-like polymer such as polybutadiene, polyisoprene or a rubbery butadiene-styrene copolymer are also capable of improvement according to this invention. Among the halides which may be used as flameproofing agents in these polymers are acetylene tetrabromide, pentabromomonochlorocyclohexane, hexabromoethane, hexabromobenzene, pentachloroethane, hexachloroethane, tris(dichloropropyl)phosphate, tris(2,3-dibromopropyl)phosphate, and tetrachlorodibromoethane, ammonium bromide, 2,2-bis[3,5-dibromo-4-(2,3,3-tribromoalloxy)phenyl]propane, bis(2,3,3-tribromoallyl) maleate, and 2,3,3-tribromoallyl 2,4,6-tribromophenyl ether.

Self-extinguishing agents according to this invention were incorporated into a polystyrene resin by dissolving the resin and the agents in a volatile solvent such as methyl chloride then evaporating the solvent, leaving a foamed solid. Samples of this material were cut into strips ¼ inch thick and ½ inch wide for testing. These strips were held in the flame of a burner for four seconds then withdrawn from the flame and the time noted for the sample to extinguish. Those samples which did not extinguish within 15 seconds were considered not to be self-extinguishing. The results of these tests are reported in Table I. The concentrations of the hydrazone and acetylene tetrabromide (ATB) are in parts per hundred parts of resin. The self-extinguishing (S.E.) times are in seconds with the reported values being the averages of the times noted in multiple tests with each particular composition.

Table I.—Self-extinguishing properties of polystyrene containing acetylene tetrabromide and various hydrazones

| Hydrazone | Phr. | ATB, phr. | S.E. Time, seconds |
|---|---|---|---|
|  | 0 | 2.5 | (1) |
|  | 0 | 3 | 8 |
| 2-propanone phenylhydrazone | 1 | 2 | <1 |
| 2-butanone phenylhydrazone | 1 | 2 | 5 |
| 3-pentanone phenylhydrazone | 1 | 2 | 7.6 |
| 2-pentanone phenylhydrazone | 1 | 2 | 4.6 |
| Acetophenone phenylhydrazone | 1 | 2 | 4.6 |
| Hexanonephenone phenylhydrazone | 1 | 2 | 8.6 |
| Benzophenone phenylhydrazone | 1 | 2 | 4.2 |
| 2,3-pentanedione bis-phenylhydrazone | 1 | 2 | 8.6 |
| 2-propanone 2,5-dichlorophenylhydrazone | 1 | 2 | 7.6 |
| Acetophenone 2,5-dichlorophenylhydrazone | 1 | 2 | 9.4 |
| 2-propanone 1-methyl-1-phenylhydrazone | 0.5 | 1 | 11 |
| Acetophenone 1-methyl-1-phenylhydrazone | 0.5 | 2 | <1 |
| Benzophenone 1-methyl-1-phenylhydrazone | 1 | 2 | 5 |
| 2-propanone 1,1-diphenylhydrazone | 0.5 | 1 | 11 |
| Acetophenone 1,1-diphenylhydrazone | 0.5 | 1 | 2.8 |
| Benzophenone 1,1-diphenylhydrazone | 1 | 2 | 2.4 |

[1] Burns.

In these data it can be seen that about ⅓ or more of the acetylene tetrabromide can be substituted with a hydrazone without experiencing an increase in the S.E. time and in most instances a shorter time is obtained. The data further show that resin containing 2.5 parts acetylene tetrabromide per hundred parts resin is not self-extinguishing whereas a sample containing only 2 phr. of the halide in combination with 2 phr. of the hydrazone extinguishes in less than one second. Thus, the concentration of halide required for self-extinguishing properties can be reduced, thereby decreasing some of the undesirable characteristics which are produced by the halide.

The utility of a hydrazone adjuvant with other flameproofing compounds was determined in a series of tests where the samples were prepared by the solution mixing technique described above. The results of these tests are given in Table II.

*Table II.—Self-extinguishing properties of polystyrene containing 2-propanone phenylhydrazone and a halide*

| Halide | Phr. | Hydrazone, phr. | S.E. Time, seconds |
|---|---|---|---|
| Dibromotetrachloroethane | 2 | 0 | (1) |
| Do | 1 | 1 | 3 |
| Pentabromomonochlorocyclohexane | 2 | 0 | (1) |
| Do | 1 | 1 | 2.4 |
| Hexabromoethane | 1 | 0 | (1) |
| Do | 1 | 1 | 9 |
| Hexabromobenzene | 4 | 0 | (1) |
| Do | 2 | 2 | 12 |
| Tris(2,3-dibromopropyl)phosphate | 4 | 0 | (1) |
| Do | 2 | 2 | 2.8 |
| Pentachloroethane | 12 | 0 | (1) |
| Do | 10 | 2 | 7.8 |
| Hexachloroethane | 12 | 0 | (1) |
| Do | 10 | 2 | 3 |
| Tris(dichloropropyl)phosphate | 15 | 0 | (1) |
| Do | 10 | 2 | 1.8 |

1 Burns.

As in Table I, the S.E. times reported are the averages of several tests. Acetone phenylhydrazone (2-propanone phenylhydrazone) was used in preparing all of these samples. These data illustrate the effectiveness of the hydrazone as an adjuvant with many of the common halide flameproofing agents. The data show that a part of the halide in the resin can be substituted with the hydrazone with a substantial decrease in the time for extinguishment.

A further group of samples was prepared by the solution mixing technique to evaluate the adjuvant with other alkylene aromatic polymers. The results of tests with those samples are presented in Table III. The halide used in preparing these samples was acetylene tetrabromide and the hydrazone was acetone phenylhydrazone.

*Table III.—Self-extinguishing properties of alkenyl aromatic polymers containing a hydrazone and a halide*

| Polymer | Hydrazone, phr. | Halide, phr. | S.E. Time, seconds |
|---|---|---|---|
| Polystyrene, high impact | 0 | 5 | 6 |
| Do | 1 | 4 | 2 |
| Polystyrene, 79% styrene, 21% α-methyl styrene | 0 | 8 | 15 |
| Do | 2 | 6 | 3 |
| Polyvinyltoluene | 0 | 8 | (1) |
| Do | 2 | 6 | 12 |
| Polystyrene, 93% styrene, 7% acrylonitrile | 0 | 4 | 14 |
| Do | 1 | 3 | <1 |

1 Burns.

As in the previous tables, the reported S.E. times are the averages of several tests. Also, the concentrations of hydrazone and halide are expressed as parts per hundred parts of resin. The high impact polystyrene listed in the table is a styrene polymer containing about 5 weight percent of a butadiene-styrene elastomer type copolymer. Although these copolymers or polymer blend types of resins require a higher concentration of flameproofing agents than the polystyrene homopolymer, the data in Table II illustrate the ability of a hydrazone to enhance the flameproofing property of the halide in these resins.

The hydrazones generally inhibit the polymerization of the alkenyl aromatic compounds, therefore, they cannot be added during the polymerization step and must be incorporated later. In addition to the solution mixing technique used in the preparation of the test samples the flameproofing agents may be incorporated by a pressurization technique wherein granules of the polymer are added to a non-solvent aqueous solution containing a suspending agent such as methyl cellulose along with the flameproofing additives. A small quanity of a blowing agent such as normal pentane, e.g. about 2 to 10 percent by weight of the polymer may be added to the suspension to produce a foamable polymer. The solution may also contain minor amounts of dissolved salts, low molecular weight alcohols and ketones which promote the absorption of the flameproofing agents by the resin. The slurry is placed in a pressure-tight vessel and agitated as it is heated to about 90–130° C. over a period of about 15–30 minutes and held at that temperature for a time up to about four hours then cooled to approximately room temperature over a period of about 1–2 hours. The granules of polymer recovered from the slurry following this pressurization step usually contain about 75–95 percent of the flameproofing agents initially added to the slurry.

The self-extinguishing times of polystyrene samples which were flameproofed by this pressurization process are shown in Table IV. The flameproofing agents used in preparing these samples were acetylene tetrabromide (ATB) and acetone phenylhydrazone. The samples were brought up to pressurization temperature over a period of 20 minutes and cooled to room temperature over a period of 80 minutes following pressurization.

*Table IV.—Polystyrene flameproofed by pressurization*

| Acetone Phenylhydrazone, phr. | ATB, phr. | Pressurization | | S.E. Time, seconds |
|---|---|---|---|---|
| | | Temp., °C. | Time, Hr. | |
| 0 | 3 | 95 | 0 | (1) |
| 0 | 4 | 95 | 0 | 10 |
| 1 | 1.5 | 95 | 0 | 6.4 |
| 1 | 1.5 | 95 | 1 | 3.2 |
| 1 | 1.5 | 95 | 3 | 1.8 |
| 1 | 1.5 | 105 | 1 | 1.1 |
| 2 | 1.5 | 130 | 3 | 5 |

1 Burns.

The self-extinguishing resins prepared by the solution mixing technique were porous, foamed materials. Additional tests were conducted to determine whether a non-foamed resin has significantly different flameproofing characteristics. To do this, samples of the foamed material were ground and the powder molded into test strips at 135–140° C. for 1½ minutes. As in the foamed sample reported in Table I, the molded strip containing 2.5 phr. acetylene tetrabromide with no adjuvant was not self-extinguishing whereas a strip containing only one phr. acetylene tetrabromide in combination with 1.5 phr. acetone phenylhydrazone had a self-extinguishing time of 8 seconds.

From the foregoing it can be seen that some of the hydrazones are more active adjuvants than others and some halides permit the advantageous use of higher concentrations of the hydrazone than others. The preferred range of hydrazone concentration which may be used according to this invention is from about 0.5 to about 3 parts per hundred parts resin.

I claim:
1. A self-extinguishing polymer selected from the group consisting of homopolymers and copolymers of styrene,

α-methylstyrene, ethyl styrene, isopropyl styrene, tert.-butyl styrene, vinyl toluene, vinyl xylene and chlorostyrene and such homopolymers and copolymers containing about 2 to 20 weight percent of an elastomer selected from the group consisting of polybutadiene, polyisoprene, and butadiene-styrene copolymers, containing a halide selected from the group consisting of ammonium bromide, organic chlorides and organic bromides together with about 0.5 to 3 parts per hundred parts of said polymer of a hydrazone having the general formula:

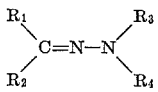

wherein $R_1$ represents an alkyl, aryl, or aralkyl radical; $R_2$ represents an alkyl, aryl, or aralkyl radical or a hydrazone group having the general formula:

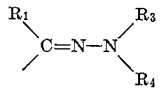

$R_3$ is hydrogen or an alkyl, aryl, or aralkyl radical; and $R_4$ is an aryl, aralkyl, or a halogenated aryl radical.

2. The self-extinguishing polymer of claim 1 wherein said hydrazone is 2-propanone phenylhydrazone.

3. The self-extinguishing polymer of claim 1 wherein said hydrazone is 2,3-pentanedione bis-phenylhydrazone.

4. The self-extinguishing polymer of claim 1 wherein said hydrazone is acetophenone 1-methyl-1-phenylhydrazone.

5. The self-extinguishing polymer of claim 1 wherein said hydrazone is acetophenone 1,1-diphenylhydrazone.

6. A self-extinguishing styrene polymer containing 2 parts of acetylene tetrabromide per hundred parts of polymer and one part of 2-propanone phenylhydrazone per hundred parts of polymer.

7. A method for producing a foamable self-extinguishing alkenyl aromatic resin comprising:

dispersing granules of a resin selected from the group consisting of homopolymers and copolymers of styrene, α-methylstyrene, ethyl styrene, isopropyl styrene, tert.-butyl styrene, vinyl toluene, vinyl xylene and chlorostyrene and such homopolymers and copolymers containing about 2 to 20 weight percent of an elastomer selected from the group consisting of polybutadiene, polyisoprene, and butadiene-styrene copolymers, in an aqueous solution together with a blowing agent, a flameproofing halide selected from the group consisting of ammonium bromide, organic chlorides and organic bromides and about 0.5 to 3 parts per hundred parts resin of a hydrazone according to the general formula

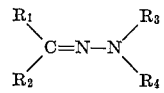

wherein $R_1$ represents an alkyl, aryl, or aralkyl radical; $R_2$ represents an alkyl, aryl, or aralkyl radical or a hydrazone group having the general formula:

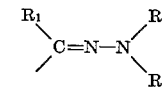

$R_3$ is hydrogen or an alkyl, aryl, or aralkyl radical; and $R_4$ is an aryl, aralkyl, or a halogenated aryl radical, agitating the resulting dispersion while gradually increasing the temperature thereof to a level in the range 90–130° C., continuing the agitation of said dispersion while maintaining said temperature level for a period of time up to about four hours, then gradually decreasing the temperature of said dispersion to approximately room temperature and recovering said resin granules therefrom.

8. A method for producing a self-extinguishing alkenyl aromatic resin comprising:

dispersing granules of a resin selected from the group consisting of homopolymers and copolymers of styrene, α-methylstyrene, ethyl styrene, isopropyl styrene, tert.-butyl styrene, vinyl toluene, vinyl xylene and chlorostyrene and such homopolymers and copolymers containing about 2 to 20 weight percent of an elastomer selected from the group consisting of polybutadiene, polyisoprene, and butadiene-styrene copolymers, in an aqueous solution together with a flameproofing halide selected from the group consisting of ammonium bromide, organic chloride and organic bromides and about 0.5 to 3 parts per hundred parts resin of a hydrazone according to the general formula

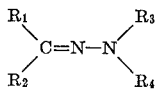

wherein $R_1$ represents an alkyl, aryl, or aralkyl radical; $R_2$ represents an alkyl, aryl, or aralkyl radical or a hydrazone group having the general formula:

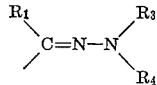

$R_3$ is hydrogen or an alkyl, aryl, or aralkyl radical; and $R_4$ is an aryl, aralkyl, or a halogenated aryl radical, agitating the resulting dispersion while gradually increasing the temperature thereof to a level in the range 90–130° C., continuing the agitation of said dispersion while maintaining said temperature level for a period of time up to about four hours, then gradually decreasing the temperature of said dispersion to approximately room temperature and recovering said resin granules therefrom.

9. A method for producing a self-extinguishing styrene resin comprising:

dispersing granules of polystyrene in an aqueous solution together with a flameproofing halide selected from the group consisting of ammonium bromide, organic chlorides and organic bromides and about 0.5 to 3 parts of 2-propanone phenylhydrazone, per hundred parts polystyrene, agitating the resulting dispersion while increasing the temperature to about 95° C. over a period of about 20 minutes, continuing to agitate said dispersion while maintaining the temperature at about 95° C. for a period up to 3 hours, then decreasing the temperature of said dispersion to approximately room temperature over a period of about 80 minutes, thereafter recovering said resin granules from said dispersion.

References Cited by the Examiner
UNITED STATES PATENTS 3,001,954 9/1961 Buchholz et al. _____ 260—2.5
3,149,092 9/1964 Rodgers et al. _____ 260—45.9

LEON J. BERCOVITZ, *Primary Examiner.*

M. J. WELSH, *Assistant Examiner.*